(12) United States Patent
Chao et al.

(10) Patent No.: US 10,740,915 B1
(45) Date of Patent: *Aug. 11, 2020

(54) CIRCULARLY POLARIZED ILLUMINATION AND DETECTION FOR DEPTH SENSING

(71) Applicant: Facebook Technologies, LLC, Menlo Park, CA (US)

(72) Inventors: Qing Chao, Redmond, WA (US); Michael Hall, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,391

(22) Filed: Nov. 27, 2018

Related U.S. Application Data

(63) Continuation of application No. 15/636,398, filed on Jun. 28, 2017, now Pat. No. 10,181,200.

(51) Int. Cl.
*G06T 7/00* (2017.01)
*G06T 7/521* (2017.01)
*H04N 5/225* (2006.01)
*G02B 26/08* (2006.01)
*G02B 5/18* (2006.01)
*G02B 26/10* (2006.01)
*G02B 5/30* (2006.01)
*G06F 1/16* (2006.01)

(52) U.S. Cl.
CPC .......... *G06T 7/521* (2017.01); *G02B 5/1828* (2013.01); *G02B 26/0808* (2013.01); *H04N 5/2256* (2013.01); *G02B 5/3025* (2013.01); *G02B 26/10* (2013.01); *G06F 1/163* (2013.01); *G06F 1/1637* (2013.01); *G06F 1/1686* (2013.01); *G06T 2207/10028* (2013.01)

(58) Field of Classification Search
CPC .......... G06T 7/521; G06T 2207/10028; G02B 5/1828; G02B 26/0808; G02B 5/3025; G02B 26/10; H04N 5/2256; G06F 1/163; G06F 1/1637; G06F 1/1686
See application file for complete search history.

(56) References Cited

U.S. PATENT DOCUMENTS 9,804,397 B2 10/2017 Schowengerdt et al.
10,027,386 B2 7/2018 Kohli
10,158,845 B2 12/2018 Zhu et al.
(Continued)

*Primary Examiner* — Zhihan Zhou
(74) *Attorney, Agent, or Firm* — Fenwick & West LLP

(57) ABSTRACT

A depth camera assembly (DCA) for depth sensing of a local area. The DCA includes a polarized light generator, an imaging device, and a controller. The polarized light generator modulates one or more optical beams emitted from an illumination source to generate modulated light, and projects the modulated light into the local area as polarized light having a first polarization. The imaging device receives light from the local area, the received light including ambient light and a portion of the polarized light reflected from the local area. The imaging device reduces an intensity of the received light having polarization different from a second polarization to generate filtered light substantially composed of light of the second polarization, and detects the portion of the polarized light having the second polarization using the filtered light. The controller determines depth information for the local area based on the detected portion of the polarized light.

20 Claims, 5 Drawing Sheets

(56) References Cited

U.S. PATENT DOCUMENTS

| | | |
|---|---|---|
| 10,181,200 B1 | 1/2019 | Chao et al. |
| 10,388,026 B1 | 8/2019 | Chao et al. |
| 10,412,371 B1 | 9/2019 | Chao et al. |
| 2004/0108971 A1* | 6/2004 | Waldern ............. G02B 27/0093 345/8 |
| 2008/0246952 A1* | 10/2008 | Fenrich ............. G06K 9/00046 356/71 |
| 2010/0304854 A1* | 12/2010 | McEldowney ...... G06K 9/2027 463/30 |
| 2011/0298918 A1* | 12/2011 | McEldowney .......... G01C 3/08 348/136 |
| 2013/0343705 A1* | 12/2013 | Vermeulen ............... G02B 6/34 385/37 |
| 2014/0293737 A1 | 10/2014 | Sangawa et al. |
| 2015/0241705 A1* | 8/2015 | Abovitz .............. G06F 16/7837 385/37 |
| 2016/0043350 A1* | 2/2016 | Cho ..................... G02B 5/3083 257/40 |
| 2016/0097930 A1* | 4/2016 | Robbins ............. G02B 27/0172 345/8 |
| 2016/0135688 A1 | 5/2016 | Ebisawa |
| 2016/0249982 A1* | 9/2016 | Varghese ............. A61B 18/203 606/9 |
| 2016/0295201 A1* | 10/2016 | So ........................ H04N 5/4403 |
| 2016/0313244 A1 | 10/2016 | Shiono |
| 2017/0122728 A1 | 5/2017 | Kipfer et al. |
| 2017/0301736 A1* | 10/2017 | Wang ................... G06F 3/0412 |
| 2017/0350575 A1 | 12/2017 | Hill et al. |
| 2018/0061034 A1 | 3/2018 | Zhao et al. |
| 2018/0131929 A1* | 5/2018 | Lee ..................... H04N 13/204 |
| 2018/0204340 A1* | 7/2018 | Zhao ................... H04N 13/106 |
| 2018/0275410 A1 | 9/2018 | Yeoh et al. |
| 2019/0008388 A1 | 1/2019 | Ando et al. |
| 2019/0066316 A1 | 2/2019 | Bardagjy et al. |

\* cited by examiner

CIRCULARLY POLARIZED ILLUMINATION AND DETECTION FOR DEPTH SENSING

CROSS REFERENCE TO RELATED APPLICATIONS

This application is a continuation of co-pending U.S. application Ser. No. 15/636,398, filed Jun. 28, 2017, which is incorporated by reference in its entirety.

BACKGROUND

The present disclosure generally relates to depth sensing, and specifically relates to circularly polarized illumination and detection for depth sensing.

To achieve compelling augmented reality (AR) and virtual reality (VR) user experiences, it is desired to create a depth sensing device that can determine a dense three-dimensional mapping in both indoor and outdoor surroundings. A depth camera usually involves structured light illumination, which is a triangulation technique that makes use of an active illumination source to project known patterns into a scene. The depth camera typically utilizes a two-dimensional pixel array detector to measure and record light back-scattered from one or more objects in the scene. Other methods for depth sensing are based on a time-of-flight technique, which measures a round trip travel time-of-light projected into the scene and returning to pixels on a sensor array. The problem related to the depth sensing methods based on structured light illumination and time-of-flight is related to designing a compact and efficient depth camera that can produce quality depth maps in both indoor and outdoor environments where background ambient light can strongly interfere depth measurements. The depth map obtained in these environments typically have large depth errors and a low level of signal-to-noise ratio (SNR) due to the strong background ambient light.

SUMMARY

A depth camera assembly (DCA) determines depth information associated with one or more objects in a local area. The DCA comprises a polarized light generator, an imaging device and a controller.

The polarized light generator is configured to illuminate the local area with polarized light in accordance with emission instructions. The polarized light generator comprises an illumination source, a modulator, and a projection assembly. The illumination source is configured to emit one or more optical beams. In some embodiments, the illumination source directly generates the one or more optical beams as light of a certain polarization, e.g., based on a polarizing element integrated into the illumination source or placed in front of the illumination source. The modulator is configured to modulate the one or more optical beams based in part on the emission instructions to form a modulated light for scanning the local area. In some embodiments, the modulator is configured as a diffractive optical element that diffracts the one or more optical beams based in part on the emission instructions to generate a diffracted light for scanning the local area with a wide field-of-view. In some embodiments, the modulator includes a polarizing element for generating the modulated light as the polarized light using the one or more optical beams, based in part on the emission instructions. In some embodiments, the modulator configured as an acousto-optic deflector directly generates the modulated light as the polarized light without any additional polarizing element. In alternate embodiments, the modulator can be configured as a liquid crystal grating device that directly generates the modulated light as the polarized light without any additional polarizing element. The projection assembly is configured to project the polarized light into the local area. In some embodiments, the projection assembly includes the polarizing element for generating the polarized light using the modulated light generated by the modulator as un-polarized light. The polarized light projected into the local area has a first polarization, e.g., circular polarization.

The imaging device is configured to capture portions of the polarized light reflected from the one or more objects in the local area. The imaging device includes another polarizing element and a detector. The other polarizing element of the imaging device is configured to receive light from the local area, the received light including ambient light and a portion of the polarized light reflected from the one or more objects in the local area. The other polarizing element of the imaging device is also configured to reduce an intensity of the received light having polarization different from a second polarization (e.g., the ambient light) to generate filtered light substantially composed of light of the second polarization. In some embodiments, the polarizing element blocks the ambient light for reaching the detector. The detector is configured to detect the portion of the polarized light reflected from the one or more objects in the local area having the second polarization using the filtered light. The controller may be coupled to both the polarized light generator and the imaging device. The controller generates the emission instructions and provides the emission instructions to the polarized light generator. The controller is also configured to determine depth information for the one or more objects based at least in part on the detected portion of the reflected polarized light.

A head-mounted display (HMD) can further integrate the DCA. The HMD further includes an electronic display and an optical assembly. The HMD may be, e.g., a virtual reality (VR) system, an augmented reality (AR) system, a mixed reality (MR) system, or some combination thereof. The electronic display is configured to emit image light. The optical assembly is configured to direct the image light to an exit pupil of the HMD corresponding to a location of a user's eye, the image light comprising the depth information of the one or more objects in the local area determined by the DCA.

Figure 1:
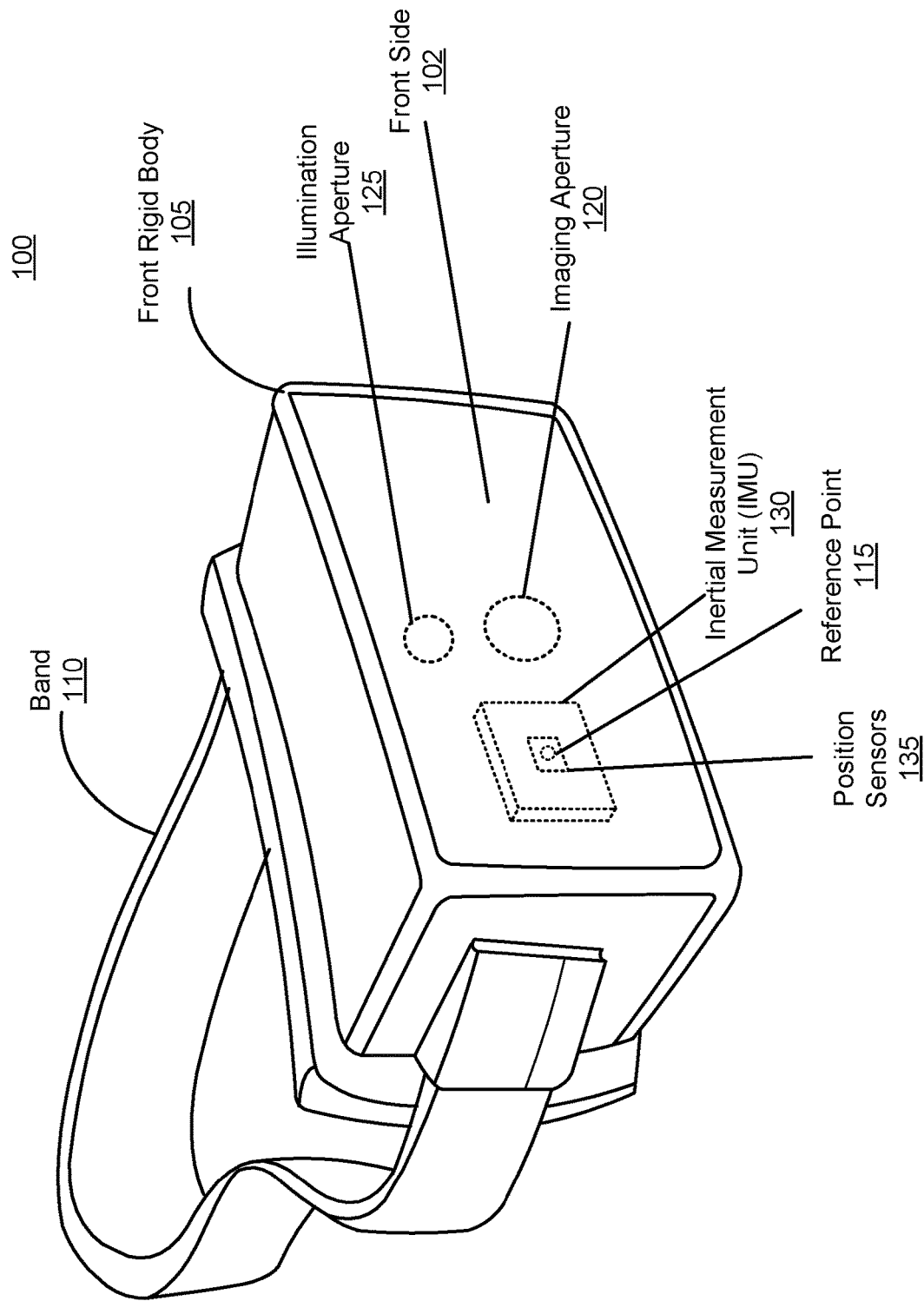
FIG. 1 is a diagram of a head-mounted display (HMD), in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A depth camera assembly (DCA) for determining depth information of objects in a local area surrounding some or all of the DCA. The DCA includes a light source, a camera and a controller. The light source includes a laser source and a modulator that generates light that is, e.g., circularly polarized at a first handedness, using light emitted from the laser source. The light source also projects the generated circularly polarized light into the local area. The camera captures portions of the circularly polarized light reflected from the objects in the local area. The camera is configured as a polarization sensitive camera that detects the reflected circularly polarized light of a second handedness that may be opposite the first handedness. The use of polarized light increases a signal-to-noise ratio (SNR) as an intensity of un-polarized background ambient light can be efficiently reduced at the polarization sensitive camera. The controller determines depth information based on the captured portions of the reflected circularly polarized light.

Disclosed embodiments relate to a DCA based on a high speed circularly polarized illumination and detection technique. An illuminator of the DCA generates circularly polarized light for scanning an environment surrounding some or all of the DCA. In some embodiments, for depth sensing methods based on structured light illumination, the generated circularly polarized light is structured light of a defined pattern, e.g., a pattern of light having parallel stripes in a propagating direction. In some embodiments, the illuminator of the DCA includes an acousto-optic deflector to actively scan the environment in a high speed (MHz speed) using, e.g., infrared wavelength(s). In alternate embodiments, the illuminator of the DCA includes a liquid crystal device to actively scan the environment in a moderate speed (kHz speed) using, e.g., infrared wavelength(s). A circularly polarized detector camera with a large field-of-view may be utilized to detect portions of the circularly polarized light reflected from the environment. Note that the portions of the circularly polarized light can be also scattered from one or more objects in the environment, wherein scattering represents a form of diffuse reflection. In some embodiments, for depth sensing methods based on time-of-flight, the circularly polarized detector camera includes a single pixel detector. In alternate embodiments, for depth sensing methods based on structured light illumination, the circularly polarized detector camera includes a two-dimensional detector pixel array.

In some embodiments, the DCA is integrated into a head-mounted display (HMD) that captures data describing depth information in a local area surrounding some or all of the HMD. The HMD may be part of, e.g., a virtual reality (VR) system, an augmented reality (AR) system, a mixed reality (MR) system, or some combination thereof. The HMD further includes an electronic display and an optical assembly. The electronic display is configured to emit image light. The optical assembly is configured to direct the image light to an exit pupil of the HMD corresponding to a location of a user's eye, the image light comprising the depth information of the objects in the local area determined by the DCA.

FIG. 1 is a diagram of a HMD 100, in accordance with an embodiment. The HMD 100 may be part of, e.g., a VR system, an AR system, a MR system, or some combination thereof. In embodiments that describe AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105, a band 110, and a reference point 115. The HMD 100 also includes a DCA configured to determine depth information of a local area surrounding some or all of the HMD 100. The HMD 100 also includes an imaging aperture 120 and an illumination aperture 125, and an illumination source of the DCA emits light (e.g., structured light) through the illumination aperture 125. An imaging device of the DCA captures light from the illumination source that is reflected from the local area through the imaging aperture 120. Light emitted from the illumination source of the DCA through the illumination aperture 125 comprises polarized light, as discussed in more detail in conjunction with FIGS. 2-4. Light from the local area received through the imaging aperture 120 and captured by the imaging device of the DCA includes ambient light and a portion of the polarized light reflected from one or more objects in the local area. The imaging device of the DCA reduces an intensity of the received light having polarization different from a specific polarization related to the polarized light to generate filtered light substantially composed of light of the specific polarization, thus increasing an SNR of the received light, as discussed in more detail in conjunction with FIGS. 2-4. The imaging device of the DCA detects the portion of the polarized light reflected from the one or more objects in the local area having the specific polarization using the filtered light, as also discussed in more detail in conjunction with FIGS. 2-4.

The front rigid body 105 includes one or more electronic display elements (not shown in FIG. 1), one or more integrated eye tracking systems (not shown in FIG. 1), an Inertial Measurement Unit (IMU) 130, one or more position sensors 135, and the reference point 115. In the embodiment shown by FIG. 1, the position sensors 135 are located within the IMU 130, and neither the IMU 130 nor the position sensors 135 are visible to a user of the HMD 100. The IMU 130 is an electronic device that generates fast calibration data based on measurement signals received from one or more of the position sensors 135. A position sensor 135 generates one or more measurement signals in response to motion of the HMD 100. Examples of position sensors 135 include: one or more accelerometers, one or more gyroscopes, one or more magnetometers, another suitable type of sensor that detects motion, a type of sensor used for error correction of the IMU 130, or some combination thereof. The position sensors 135 may be located external to the IMU 130, internal to the IMU 130, or some combination thereof.

Figure 2:
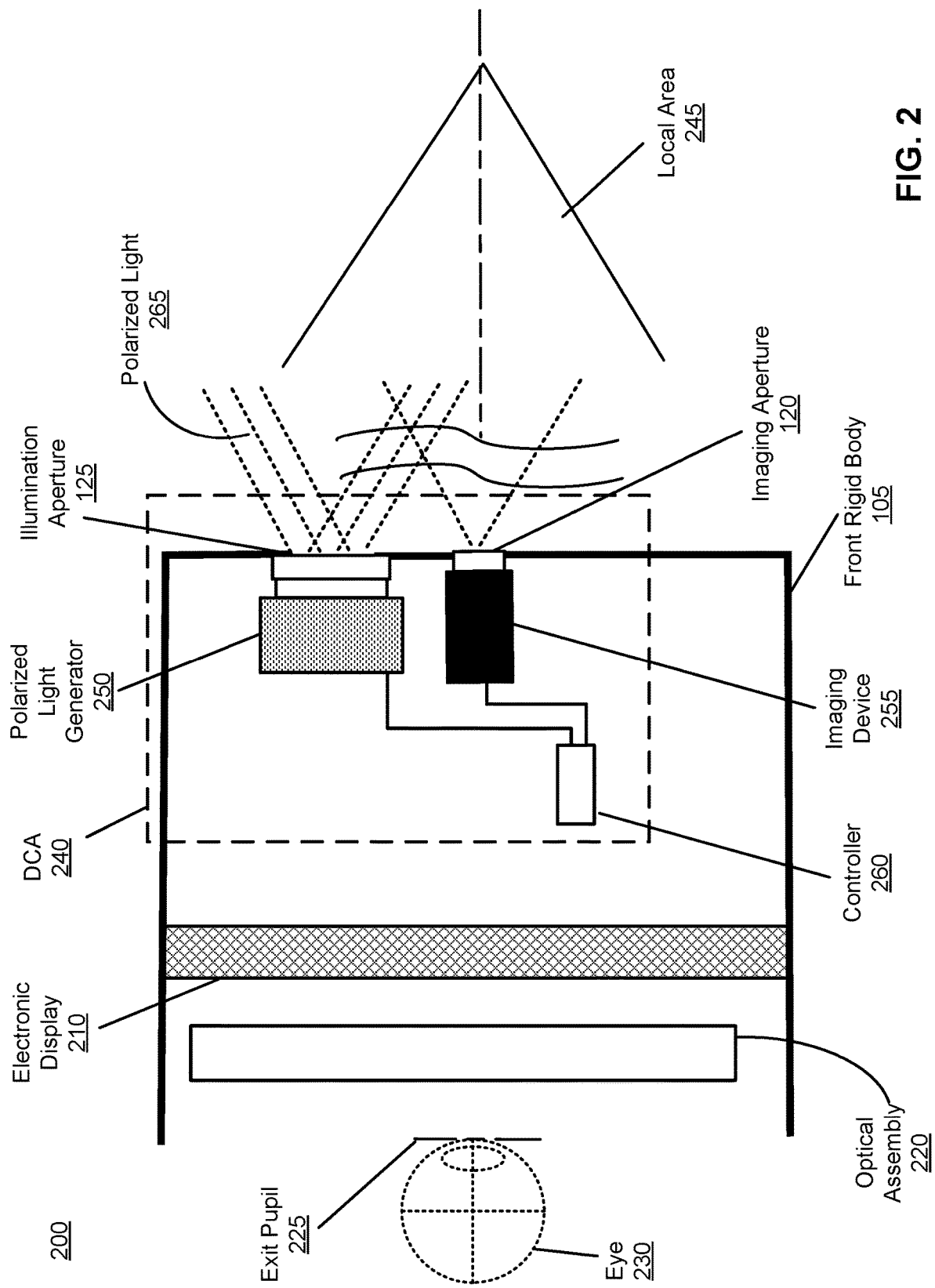
FIG. 2 is a cross section of a front rigid body of the HMD in FIG. 1, in accordance with an embodiment.

FIG. 2 is a cross section 200 of the front rigid body 105 of the HMD 100 shown in FIG. 1. As shown in FIG. 2, the front rigid body 105 includes an electronic display 210 and an optical assembly 220 that together provide image light to an exit pupil 225. The exit pupil 225 is the location of the front rigid body 105 where a user's eye 230 is positioned. For purposes of illustration, FIG. 2 shows a cross section 200 associated with a single eye 230, but another optical assembly 220, separate from the optical assembly 220, provides altered image light to another eye of the user. The front rigid body 105 also has an optical axis corresponding to a path along which image light propagates through the front rigid body 105.

The electronic display 210 generates image light. In some embodiments, the electronic display 210 includes an optical element that adjusts the focus of the generated image light. The electronic display 210 displays images to the user in accordance with data received from a console (not shown in FIG. 2). In various embodiments, the electronic display 210 may comprise a single electronic display or multiple electronic displays (e.g., a display for each eye of a user). Examples of the electronic display 210 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 210 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings.

The optical assembly 220 magnifies received light from the electronic display 210, corrects optical aberrations associated with the image light, and the corrected image light is presented to a user of the HMD 100. At least one optical element of the optical assembly 220 may be an aperture, a Fresnel lens, a refractive lens, a reflective surface, a diffractive element, a waveguide, a filter, or any other suitable optical element that affects the image light emitted from the electronic display 210. Moreover, the optical assembly 220 may include combinations of different optical elements. In some embodiments, one or more of the optical elements in the optical assembly 220 may have one or more coatings, such as anti-reflective coatings, dichroic coatings, etc. Magnification of the image light by the optical assembly 220 allows elements of the electronic display 210 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases all, of the user's field-of-view. In some embodiments, the optical assembly 220 is designed so its effective focal length is larger than the spacing to the electronic display 210, which magnifies the image light projected by the electronic display 210. Additionally, in some embodiments, the amount of magnification may be adjusted by adding or removing optical elements.

As shown in FIG. 2, the front rigid body 105 further includes a DCA 240 for determining depth information of one or more objects in a local area 245 surrounding some or all of the HMD 100. The DCA 240 includes a polarized light generator 250, an imaging device 255, and a controller 260 that may be coupled to both the polarized light generator 250 and the imaging device 255. The polarized light generator 250 emits polarized light through the illumination aperture 125. The polarized light generator 250 illuminates the local area 245 with polarized light 265 in accordance with emission instructions generated by the controller 260. The controller 260 may control operation of certain components of the polarized light generator 250, based on the emission instructions. In some embodiments, the controller 260 may provide the emission instructions to a modulator of the polarized light generator 250 to control modulation of the polarized light 265, e.g., to control polarization of the polarized light 265 and/or to control a field-of-view of the local area 245 illuminated by the polarized light 265. More details about controlling the modulator of the polarized light generator 250 by the controller 260 are disclosed in conjunction with FIG. 3.

The polarized light generator 250 may include a plurality of emitters that each emits light having certain characteristics (e.g., wavelength, polarization, coherence, pulse width, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. In some embodiments, a single emitter or a plurality of emitters in the polarized light generator 250 can emit light having a structured light pattern. In some embodiments, the polarized light generator 250 includes a laser diode (e.g., infrared laser diode), a modulator for modulating light emitted from the laser diode, and a polarizing element for generating polarized light, as disclosed in more detail in conjunction with FIG. 3.

The imaging device 255 is configured as a polarization sensitive camera that captures, through the imaging aperture 120, portions of the polarized light 265 reflected from the local area 245. The imaging device 255 may be implemented as a charge-coupled device (CCD) camera or a complementary metal-oxide-semiconductor (CMOS) camera. The imaging device 255 includes a polarization sensitive photodetector that uses, e.g., optically anisotropic materials to detect photons of a specific polarization. The polarization refers to type (e.g., linear, circular, elliptical, etc.) and orientation/helicity. The imaging device 255 captures one or more images of one or more objects in the local area 245 illuminated with the polarized light 265. In some embodiments, for depth sensing based on time-of-flight, the imaging device 255 includes a photodetector having one or more pixels. Each pixel in the photodetector of the imaging device 255 may include a multiple storage bins, and the imaging device can be configured to store charge in each storage bin for a particular amount of time.

The controller 260 is configured to determine depth information for the one or more objects based at least in part on the captured portions of the reflected polarized light. In some embodiments, for depth sensing based on structured light illumination, the controller 260 is configured to determine depth information based on phase-shifted patterns of the portions of the reflected polarized light distorted by shapes of the objects in the local area, and to use triangulation calculation to obtain a depth map of the local area. In alternate embodiments, for depth sensing based on time-of-flight, the controller 260 is configured to determine depth information using a ratio of charge between the storage bins associated with each pixel in the photodetector of the imaging device 255. In some embodiments, the controller 260 provides the determined depth information to a console (not shown in FIG. 2) and/or an appropriate module of the HMD 100 (e.g., a varifocal module, not shown in FIG. 2). The console and/or the HMD 100 may utilize the depth information to, e.g., generate content for presentation on the electronic display 210. More details about the DCA 240 that includes the polarized light generator 250 and the imaging device 255 configured as a polarization sensitive camera are disclosed in conjunction with FIG. 3.

In some embodiments, the front rigid body 105 further comprises an eye tracking system (not shown in FIG. 2) that determines eye tracking information for the user's eye 230. The determined eye tracking information may comprise information about an orientation of the user's eye 230 in an eye-box, i.e., information about an angle of an eye-gaze. An eye-box represents a three-dimensional volume at an output of a HMD in which the user's eye is located to receive image light. In one embodiment, the user's eye 230 is illuminated with a structured light pattern. Then, the eye tracking system can use locations of the reflected structured light pattern in a captured image to determine eye position and eye-gaze. In another embodiment, the eye tracking system determines eye position and eye-gaze based on magnitudes of image light captured over a plurality of time instants.

In some embodiments, the front rigid body 105 further comprises a varifocal module (not shown in FIG. 2). The varifocal module may adjust focus of one or more images displayed on the electronic display 210, based on the eye tracking information. In one embodiment, the varifocal module adjusts focus of the displayed images and mitigates vergence-accommodation conflict by adjusting a focal distance of the optical assembly 220 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 260 to generate content for presentation on the electronic display 210.

Figure 3:
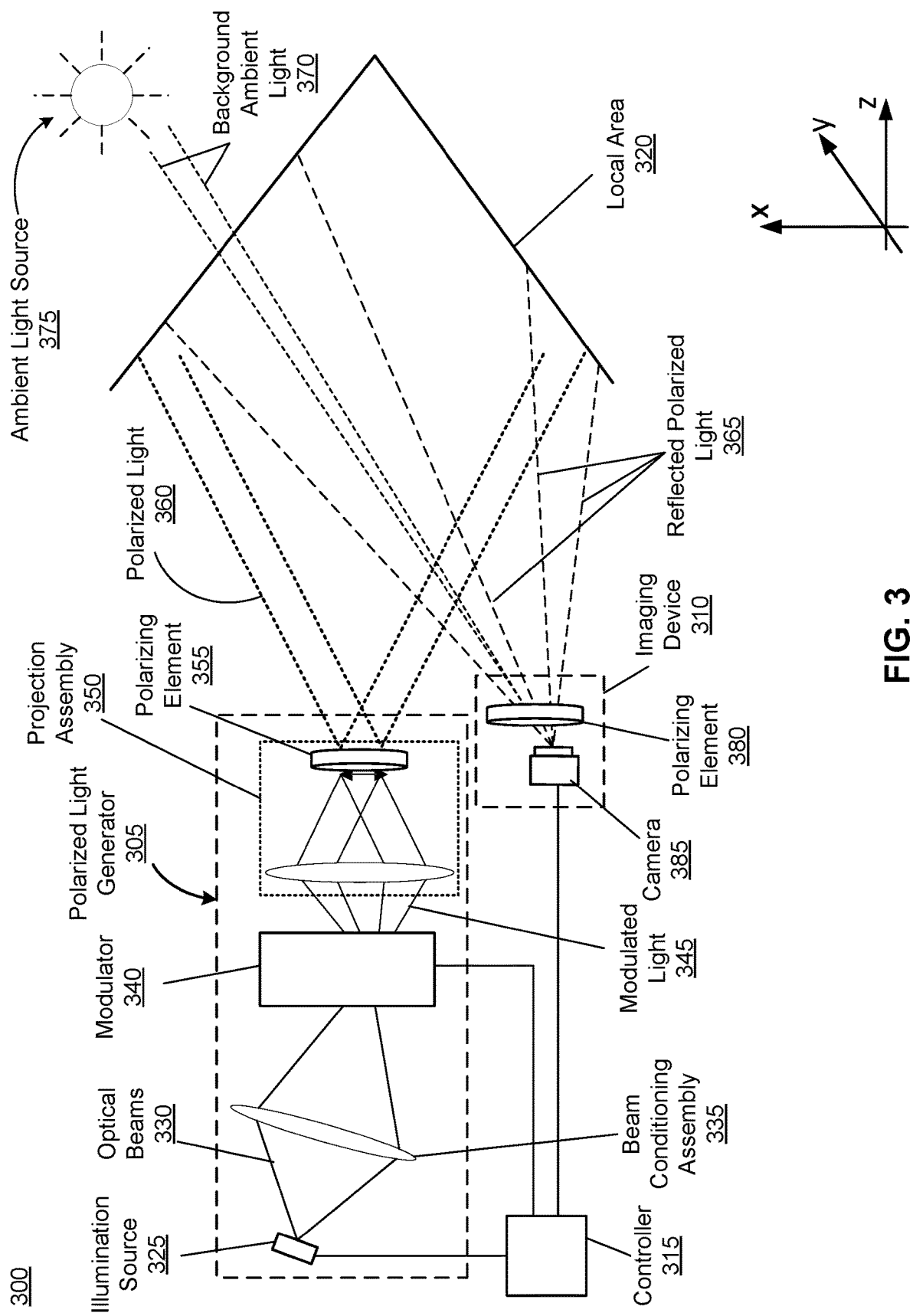
FIG. 3 is an example depth camera assembly (DCA), in accordance with an embodiment.

FIG. 3 is an example DCA 300 configured for depth sensing based on polarized light, in accordance with an embodiment. The DCA 300 includes a polarized light generator 305, an imaging device 310, and a controller 315 coupled to both the polarized light generator 305 and the imaging device 310. The DCA 300 may be configured to be a component of the HMD 100 in FIG. 1. Thus, the DCA 300 may be an embodiment of the DCA 240 in FIG. 2; the polarized light generator 305 may be an embodiment of the polarized light generator 250 in FIG. 2; and the imaging device 310 may be an embodiment of the imaging device 255 in FIG. 2.

The polarized light generator 305 is configured to illuminate a local area 320 with polarized light in accordance with emission instructions from the controller 315. The polarized light generator 305 includes an illumination source 325 configured to emit one or more optical beams 330. The illumination source 325 can be implemented as a light source operating in a continuous wave (CW) mode or in a pulsed mode. In some embodiments, the illumination source 325 is implemented as a light source with high spatial coherence, such as a super luminescent diode (SLED) or a narrow band light emitting diode (LED). In some other embodiments, the illumination source 325 is implemented as a laser diode. In one or more embodiments, the illumination source 325 can operate in the far infrared regime. The illumination source 325 based on an infrared laser diode can be used for depth sensing illumination in both indoor and outdoor surroundings because a spectrum of background ambient light coming from sun, common lamps and lighting does not overlap with an infrared spectrum and can be efficiently suppressed at the imaging device 310. The infrared light emission is invisible to an eye and is far from the optical spectrum of light emitted from common background light sources (e.g., for solar, typically 0.3 um to 2.5 um; for halogen lamps, typically 0.3 um to 2 um). In some embodiments, the illumination source 325 can directly generate the one or more optical beams 330 as polarized light, e.g., circularly polarized light. The illumination source 325 may include a polarizing element (not shown in FIG. 3) that generates the polarized one or more optical beams 330, based in part on the emission instructions from the controller 315. The polarizing element may be integrated into the illumination source 325 or placed in front of the illumination source 325. A beam conditioning assembly 335 collects light from the illumination source 325 and directs it toward a portion of a modulator 340. The beam conditioning assembly 335 is composed of one or more optical elements (lenses). The illumination source 325 (e.g., implemented as circular polarized infrared laser diode) can produce dynamic polarized illumination using the modulator 340 of various types, as discussed in more detail below.

The modulator 340 is configured to modulate the one or more optical beams 330 based in part on the emission instructions from the controller 315 to form modulated light 345 for scanning the local area 320. The modulator 340 may be configured to diffract the one or more optical beams 330 based in part on the emission instructions from the controller 315 to provide a specific field-of-view for scanning the local area 320. The modulator 340 may also include a polarizing element (not shown in FIG. 3) that generates the modulated light 345 as polarized light the one or more optical beams 330, based in part on the emission instructions from the controller 315. In some embodiments, for depth sensing of the local area 320 based on time-of-flight, the modulator 340 can be implemented as an acousto-optic deflector, an electro-optical modulator or a microelectromechanical system (MEM) mirror scanner, wherein the illumination source 325 can be implemented as a laser diode operating in the pulsed mode. In alternate embodiments, for depth sensing of the local area 320 based on structured light illumination, the modulator 340 can be implemented as diffractive-optics, an acousto-optic deflector or an electro-optical modulator, wherein the illumination source 325 can be implemented as a laser diode in the CW or pulsed mode. In this case, the modulated light 345 includes a structured light pattern, e.g., having parallel stipes in a propagating direction along z axis.

The modulator 340 implemented as an acousto-optic deflector or an electro-optical modulator (e.g., based on liquid crystal) can be employed to directly emit the modulated light 345 as, e.g., circularly polarized light for scanning the local area 320. In some embodiments, the electro-optical modulator 340 is implemented as a liquid crystal grating device. In some other embodiments, an acousto-optic deflector used as the modulator 340 can be either a bulk device or a surface wave device (SAW), wherein Germanium (Ge) crystal can be used as an acousto-optic interaction medium. An acousto-optic deflector used as the modulator 340 can not only dynamically deflect and scan light with unprecedented high speed, but also contains no mechanically moving parts (in contrast to MEM mirror scanners) and can be controlled electronically, e.g., based on the emission instructions from the controller 315. In alternate embodiments, the modulator 340 is implemented as a thin grating operating in the Raman-Nath regime. The modulator 340 operating in the Raman-Nath regime can directly generate the modulated light 345 as polarized light satisfying the Raman-Nath diffraction condition.

The modulator 340 implemented as an acousto-optic deflector generates the modulated light 345 by diffracting the one or more optical beams 330. In some embodiments, the modulator 340 implemented as the acousto-optic deflector is configured to function as a dynamic diffraction grating that diffracts the one or more optical beams 330 to form the modulated light 345, based in part on the emission instructions from the controller 315. The modulator 340 implemented as the acousto-optic deflector may include a transducer and a diffraction area (not shown in FIG. 3). Responsive to a radio frequency (RF) in the emission instructions, the transducer of the acousto-optic deflector can be configured to generate a sound wave in the diffraction area of the acousto-optic deflector to form the dynamic diffraction grating. The modulated light 345 generated by the modulator 340 implemented as the acousto-optic deflector represents structured light or hybrid structured light composed of patterns, e.g., a grid of laser dots. Each laser dot can be produced by scanning the one or more optical beams 330 emitted from the illumination source 325 (e.g., laser diode) using a specific RF frequency that drives the acousto-optic deflector to Bragg match the incoming one or more optical beams 330. The transducer of the acousto-optic deflector launches an acoustic wave to an anisotropic crystal of the acousto-optic deflector that deflects the one or more optical beams 330 at the Bragg angle. The output polarization of the modulated light satisfying the Bragg phase matching condition can be optimized at either right handed circular polarization or left handed circular polarization.

As shown in FIG. 3, a projection assembly 350 is positioned in front of the modulator 340. The projection assembly 350 includes one or more optical elements (lenses). In some embodiments, when the modulated light 345 is generated as un-polarized light, the projection assembly 350 also includes a polarizing element 355, as shown in FIG. 3. The polarizing element 355 polarizes the modulated light 345 to form polarized light 360. The projection assembly 350 projects the polarized light 360 into the local area 320. The polarized light 360 is circularly polarized light (e.g., right handed or in other embodiments left handed). In alternate embodiments, the polarized light 360 is linearly polarized light (vertical and horizontal), or elliptically polarized light (right or left). The polarizing element 355 can be a linear polarizer, a circular polarizer, an elliptical polarizer, etc. The polarizing element 355 can be implemented as a thin film polarizer (absorptive, reflective), a quarter wave plate combined with a linear polarizer, etc.

The polarized light 360 illuminates portions of the local area 320, including one or more objects in the local area 320. Reflected polarized light 365 that propagates toward the imaging device 310 is generated based on reflection of the polarized light 360 from the one or more objects in the local area 320. Due to the reflection, polarization of the reflected polarized light 365 may change in comparison with polarization of the polarized light 360. Furthermore, simultaneously with the reflected polarized light 365, background ambient light 370 also propagates toward the imaging device 310, wherein the background ambient light 370 is emitted from at least one ambient light source 375, e.g., sun in an outdoor environment or at least one lamp in an outdoor environment. In some embodiments, the background ambient light 370 reaching the imaging device 310 may be also reflected from the one or more objects in the local area 320. The background ambient light 370 is typically un-polarized or has polarization different from polarization of the reflected polarized light 365 generated based on reflection of the polarized light 360 from the one or more objects in the local area 320.

The imaging device 310 includes a polarizing element 380 and a camera 385. The polarizing element 380 is positioned in front of the camera 385. The polarizing element 380 is configured to receive portions of the reflected polarized light 365 having a specific polarization and to propagate the received portions of reflected polarized light 365 to the camera 385. The polarizing element 380 is also configured to block or mitigate propagation of the background ambient light 370 to the camera 385. Thus, the imaging device 310 is configured to function as a polarization sensitive camera. In some embodiments, the received portions of the reflected polarized light 365 can be selected from, for example, linearly polarized light (vertical and horizontal), right handed circularly polarized light, left handed circularly polarized light, and elliptically polarized light (left or right handed). The polarizing element 380 can be a linear polarizer, a circular polarizer, an elliptical polarizer, etc. The polarizing element 380 can be implemented as a thin film polarizer (absorptive, reflective), a quarter wave plate combined with a linear polarizer, etc. In some embodiments, the polarizing element 380 has a handedness or orientation that is opposite to a handedness/orientation of the polarizing element 355 in the polarized light generator 305. In alternate embodiments, a handedness/orientation of the polarizing element 380 is same as a handedness/orientation of the polarizing element 355.

The camera 385 captures one or more images of the one or more objects in the local area 320 by capturing the portions of the reflected polarized light 365 having the specific polarization. In some embodiments, the camera 385 is an infrared camera configured to capture images in the infrared. The camera 385 can be configured to operate with a frame rate in the range of kHz to MHz for fast detection of objects in the local area 320. In some embodiments, the polarizing element 380 is integrated with the camera 385. In alternate embodiments, the polarizing element 380 is internal to the camera 385. In some embodiments, for depth sensing of the local area 320 based on time-of-flight, the camera 385 can be implemented as a single-pixel detector. In alternate embodiments, for depth sensing of the local area 320 based on structured light illumination, the camera 385 can be implemented as a two-dimensional pixel array.

In some embodiments, the camera 385 is configured to have a certain inherent polarization, e.g., a circular polarization. For example, the camera 385 having an inherent circular polarization detects portions of the reflected circularly polarized light 365, e.g., left handed circularly polarized light or right handed circularly polarized light reflected from the one or more objects in the local area 320. Upon reflection of the polarized light 360 from the one or more objects in the local area 320, a helicity of the reflected polarized light 365 may be changed relative to a helicity of the polarized light 360. For example, in the case of reflection from one or more specular objects in the local area 320 that closely resemble mirrors having M44 coefficient of −1 in the Mueller scattering matrix, the helicity of the reflected polarized light 365 can be flipped relative to the helicity of the polarized light 360.

In some embodiments, the polarized light 360 generated by the polarized light generator 305 illuminates one or more highly diffusing objects in the local area 320. Temporal pulses associated with portions of the reflected polarized light 365 generated based on reflection of the polarized light 360 from the one or more highly diffusing objects in the local area 320 may be detected by the camera 385, e.g., the single-pixel camera 385. In this case, the coherence is maintained and a degree of polarization of the portions of the reflected polarized light 365 is high enough to distinguish, at the camera 385, the portions of the reflected polarized light 365 from the background ambient light 370. Therefore, for depth sensing of diffusing objects and suppressing the un-polarized background ambient light 370, the polarizing element 380 can be applied in front of the camera 385, wherein the polarizing element 380 is configured (e.g., based in part on instructions from the controller 315) for propagating light of a circular polarization opposite of a circular polarization of the emitted polarized light 360. In some embodiments, the camera 385 includes a camera lens that spatially integrates intensities of portions of the reflected polarized light 365 received within a specific field-of-view of the camera lens, wherein the polarizing element 380 can be configured to receive light at a specific near-infrared wavelength.

In some embodiments, the polarizing element 380 can be configured (e.g., based in part on instructions from the controller 315) to accept and propagate portions of the reflected polarized light 365 having a state of polarization (SOP) of the polarized light 360 that illuminates the local area 320. In the same time, the polarizing element 380 is also configured (e.g., based in part on instructions from the controller 315) to block propagation of other light components, including the background ambient light 370, having different SOPs. Note in embodiments where the camera 385 is a single pixel detector, a field-of-view is relatively larger compared to a field-of-view of the imaging device 310 when the camera 385 is based on an array of pixels. Therefore, a relatively larger amount of the background ambient light 370 can be integrated into the single pixel detector in comparison with the array of pixels. The background ambient light 370 comes from photons generated by either an indoor room lighting device or outdoor sun light (i.e., the ambient light source 375 shown in FIG. 3), wherein the sun light and light from most indoor lightings are generally un-polarized after propagating through the atmosphere. Thus, a particular SOP of the polarized light 360 can be selected for illumination of the local area 320, e.g., based in part on the emission instructions from the controller 315. Also, the imaging device 310 can be configured (e.g., based in part on instructions from the controller 315) to detect portions of the reflected light 365 having the particular SOP in order to enhance an SNR within the field-of-view of the camera 385 (e.g., the single pixel detector) while suppressing the ambient background light 370.

SOP of the un-polarized ambient light source 375, such as sun and indoor lightings, can be treated as a superposition of all states of polarizations, i.e., linear polarization, circular polarization, elliptical polarization, etc. Upon reflection of the un-polarized background ambient light 370 from surfaces of one or more objects in the local area 320, each individual SOP in the scattered/reflected background ambient light 370 can be rotated. But, as a whole, the reflected background ambient light 370 propagating toward the imaging device 310 remains un-polarized if the one or more objects in the local area 320 are isotropic and non-polarizing. While a few objects can transform the SOP, the background ambient light 370 in general remains un-polarized after reflection because all states of polarization in the background ambient light 370 are transformed as a whole. In contrast, in the case of the polarized light 360 having a single SOP, such as a circular SOP, a helicity can be flipped after reflection of the polarized light 360 from specular objects in the local area 320. In the case of reflection of the polarized light 360 from diffuse objects in the local area 320, a degree of polarization can be decreased depending on a particular diffuse object. However, the polarized light 360 having a circular polarization exhibits a polarization memory effect meaning that the degree of polarization may remain the same after reflection of the polarized light 360 from the diffuse objects in the local area 320. Another reason for generating the polarized light 360 having a circular polarization is that a circularly polarized light is very rare in nature. Therefore, for achieving efficient suppression of the background ambient light 370 at the imaging device 310, the local area 320 can be illuminated with the polarized light 360 having a circular polarization. Thus, the polarized light generator 305 in FIG. 3 can be implemented as a circularly polarized laser scanner having the modulator 340 implemented as an acousto-optic deflector. The imaging device 310 can be then implemented as a circularly polarized camera detector, e.g., the single pixel detector, operating at same wavelength(s) as the polarized light generator 305.

Figure 4:
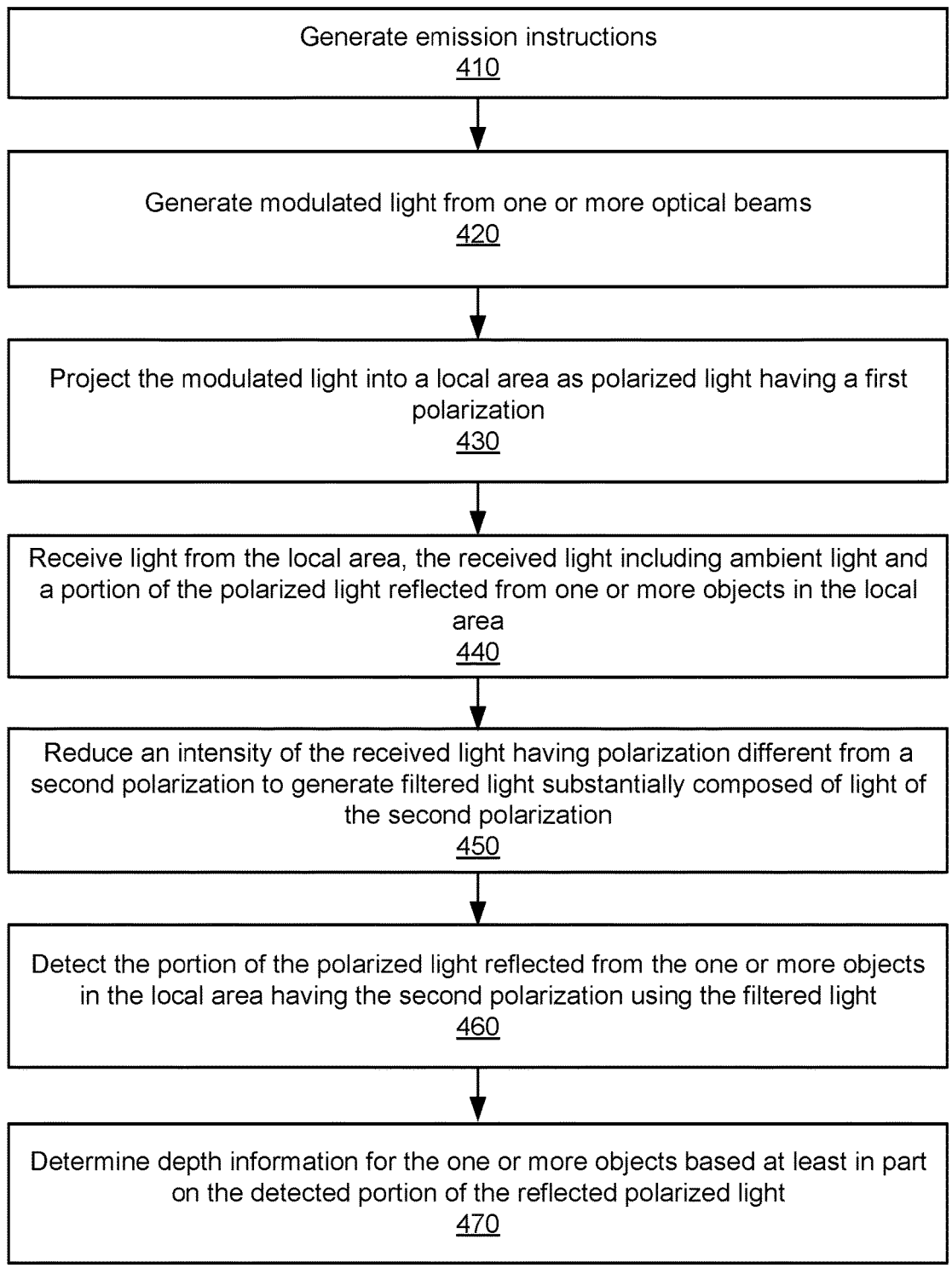
FIG. 4 is a flow chart illustrating a process of polarized illumination and detection for depth sensing, in accordance with an embodiment.

FIG. 4 is a flow chart illustrating a process 400 of determining depth information of objects in a local area based on polarized light, which may be implemented at the HMD 100 shown in FIG. 1, in accordance with an embodiment. The process 400 of FIG. 4 may be performed by the components of a DCA (e.g., the DCA 300). Other entities (e.g., a HMD and/or console) may perform some or all of the steps of the process in other embodiments. Likewise, embodiments may include different and/or additional steps, or perform the steps in different orders.

The DCA generates 410 (e.g., via a controller) emission instructions. The DCA may provide the emission instructions to an illumination source and a modulator within the DCA. Based on the emission instructions, the illumination source may emit one or more optical beams. Based on the emission instructions, the modulator may modulate the one or more optical beams. In some embodiments, the DCA generates the emission instructions which include information about a radio frequency. Responsive to the radio frequency in the emission instructions, the DCA generates a sound wave within the modulator to form a dynamic diffraction grating for diffraction of the one or more optical beams.

The DCA generates 420 (e.g., via the modulator) modulated light from the one or more optical beams. In some embodiments, the DCA generates 420 the modulated light by diffracting the one or more optical beams, based in part on the emission instructions. In some embodiments, the DCA modifies the radio frequency in the emission instructions to adjust a diffraction angle at which the one or more optical beams are diffracted and interfered to form the modulated light. The modulator may include a polarizing element implemented as a circular polarizer that generates the modulated light as circularly polarized light using the one or more optical beams, based in part on the emission instructions. In some embodiments, the modulator may directly generate the modulated light as circularly polarized light satisfying the Bragg phase matching condition.

The DCA projects 430 (e.g., via a projection assembly) the modulated light into a local area as polarized light having a first polarization. The polarized light may be circularly polarized at a first handedness. In some embodiments, the DCA projects 440 the polarized light to illuminate a wide field-of-view of the local area for accurate depth sensing of the local area. The DCA may also control (e.g., via the controller) a size of the illuminated portion of the local area by controlling the dynamic diffraction grating within the DCA.

The DCA receives 440 (e.g., via an imaging device) light from the local area, the received light including ambient light and a portion of the polarized light reflected from one or more objects in the local area. An SNR of the received light may be below a threshold for accurate detection of the portion of the reflected polarized light due to a high level of intensity of the ambient light. The ambient light may be emitted from at least one ambient light source, e.g., sun in an outdoor environment or at least one lamp in an outdoor environment.

The DCA reduces 450 (e.g., via the imaging device) an intensity of the received light having polarization different from a second polarization to generate filtered light substantially composed of light of the second polarization. In some embodiments, the second polarization is orthogonal to the first polarization of the emitted polarized light. In alternate embodiments, the second polarization is same as the first polarization of the emitted polarized light. In some embodiments, the imaging device of the DCA includes a polarizing element and a camera, wherein the polarizing element is positioned in front of the camera. The polarizing element may be configured to propagate the portion of the polarized light reflected from the local area having the second polarization and to block propagation of other light components (e.g., the ambient light) having polarization information different from the second polarization. The portion of the reflected polarized light may be circularly polarized at a second handedness, which may be different from the first handedness of the emitted polarized light.

The DCA detects 460 (e.g., via the imaging device) the portion of the polarized light reflected from the one or more objects in the local area having the second polarization using the filtered light. In some embodiments, the polarizing element of the imaging device is configured to propagate to the camera the portion of the reflected polarized light having the second polarization. In the same time, the polarizing element of the imaging device is configured to block propagation of light having polarization different from the second polarization.

The DCA determines 470 (e.g., via the controller) depth information for the one or more objects based at least in part on the detected portion of the reflected polarized light. In some embodiments, for depth sensing based on structured light illumination, the DCA captures phase-shifted patterns of the portion of the reflected polarized light distorted by shapes of the objects in the local area, and uses triangulation calculation to obtain a depth map of the local area. The DCA may enhance depth resolution of the local area based on information about the second polarization of the detected portion of the reflected polarized light. In alternate embodiments, for depth sensing based on time-of-flight, the DCA determines the depth information using a ratio of charges stored in storage bins associated with each pixel in a photodetector of the imaging device. In this case, the imaging device can be configured to store charge in each storage bin associated with an intensity of received light for a particular amount of time.

In some embodiments, the DCA is configured as part of a HMD, e.g., the HMD 100 in FIG. 1. In one embodiment, the DCA provides the determined depth information to a console coupled to the HMD. The console is then configured to generate content for presentation on an electronic display of the HMD, based on the depth information. In another embodiment, the DCA provides the determined depth information to a module of the HMD that generates content for presentation on the electronic display of the HMD, based on the depth information. In an alternate embodiment, the DCA is integrated into a HMD as part of an AR system. In this case, the DCA may be configured to sense and display objects behind a head of a user wearing the HMD or display objects recorded previously.

In some embodiments, the DCA is configured as part of AR glasses or MR glasses, where the DCA is implemented as a form of integrated optics and circuits. The DCA may include a polarized light generator implemented as an on-chip active polarized illumination device. Additionally, the DCA may include an imaging device implemented as an on-chip efficient polarization sensitive sensor device.

System Environment

Figure 5:
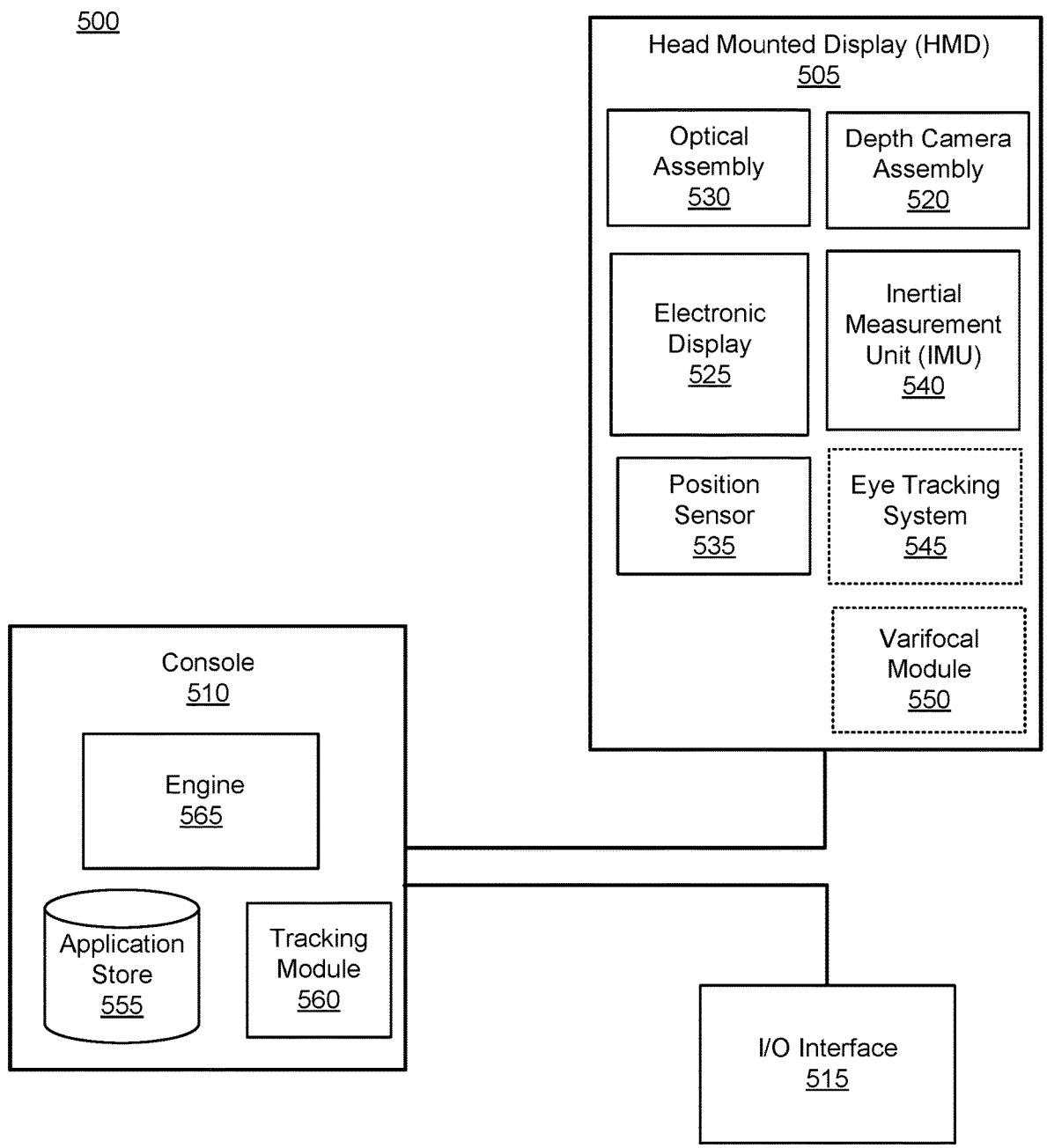
FIG. 5 is a block diagram of a HMD system in which a console operates, in accordance with an embodiment.

FIG. 5 is a block diagram of one embodiment of a HMD system 500 in which a console 510 operates. The HMD system 500 may operate in a VR system environment, an AR system environment, a MR system environment, or some combination thereof. The HMD system 500 shown by FIG. 5 comprises a HMD 505 and an input/output (I/O) interface 515 that is coupled to the console 510. While FIG. 5 shows an example HMD system 500 including one HMD 505 and on I/O interface 515, in other embodiments any number of these components may be included in the HMD system 500. For example, there may be multiple HMDs 505 each having an associated I/O interface 515, with each HMD 505 and I/O interface 515 communicating with the console 510. In alternative configurations, different and/or additional components may be included in the HMD system 500. Additionally, functionality described in conjunction with one or more of the components shown in FIG. 5 may be distributed among the components in a different manner than described in conjunction with FIG. 5 in some embodiments. For example, some or all of the functionality of the console 510 is provided by the HMD 505.

The HMD 505 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 505, the console 510, or both, and presents audio data based on the audio information. The HMD 505 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 505 is the HMD 100 described above in conjunction with FIG. 1.

The HMD 505 includes a DCA 520, an electronic display 525, an optical assembly 530, one or more position sensors 535, an IMU 540, an optional eye tracking system 545, and an optional varifocal module 550. Some embodiments of the HMD 505 have different components than those described in conjunction with FIG. 5. Additionally, the functionality provided by various components described in conjunction with FIG. 5 may be differently distributed among the components of the HMD 505 in other embodiments.

The DCA 520 captures data describing depth information of a local area surrounding some or all of the HMD 505. The DCA 520 can compute the depth information using the data (e.g., based on captured portions of polarized light), or the DCA 520 can send this information to another device such as the console 510 that can determine the depth information using the data from the DCA 520.

The DCA 520 includes a polarized light generator, an imaging device and a controller. The polarized light generator of the DCA 520 is configured to illuminate the local area with polarized light in accordance with emission instructions. The polarized light generator comprises an illumination source, a modulator, and a projection assembly. The illumination source is configured to emit one or more optical beams. In some embodiments, the illumination source directly generates the one or more optical beams as light of a certain polarization, e.g., based on a polarizing element integrated into the illumination source or placed in front of the illumination source. The modulator is configured to modulate the one or more optical beams based in part on the emission instructions to form a modulated light for scanning the local area. In some embodiments, the modulator is configured as a diffractive optical element that diffracts the one or more optical beams based in part on the emission instructions to generate a diffracted light for scanning the local area with a wide field-of-view. In some embodiments, the modulator includes a polarizing element for generating the modulated light as the polarized light using the one or more optical beams, based in part on the emission instructions. The projection assembly is configured to project the polarized light into the local area. In some embodiments, the projection assembly includes the polarizing element for generating the polarized light using the modulated light generated by the modulator as un-polarized light. The polarized light projected into the local area has a first polarization, e.g., circular polarization. The imaging device of the DCA 520 is configured to capture portions of the polarized light reflected from the one or more objects in the local area. The imaging device includes another polarizing element and a detector. The other polarizing element of the imaging device is configured to receive light from the local area, the received light including ambient light and a portion of the polarized light reflected from the one or more objects in the local area. The other polarizing element of the imaging device is also configured to reduce an intensity of the received light having polarization different from a second polarization (e.g., the ambient light) to generate filtered light substantially composed of light of the second polarization. In some embodiments, the polarizing element blocks the ambient light for reaching the detector. The detector is configured to detect the portion of the polarized light reflected from the one or more objects in the local area having the second polarization using the filtered light. The controller of the DCA 520 may be coupled to both the polarized light generator and the imaging device. The controller generates the emission instructions and provides the emission instructions to the polarized light generator. The controller is also configured to determine depth information for the one or more objects based at least in part on the detected portion of the reflected polarized light. The DCA 520 is an embodiment of the DCA 240 in FIG. 2 or the DCA 300 in FIG. 3A.

The electronic display 525 displays 2D or 3D images to the user in accordance with data received from the console 510. In various embodiments, the electronic display 525 comprises a single electronic display or multiple electronic displays (e.g., a display for each eye of a user). Examples of the electronic display 525 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optical assembly 530 magnifies image light received from the electronic display 525, corrects optical errors associated with the image light, and presents the corrected image light to a user of the HMD 505. The optical assembly 530 includes a plurality of optical elements. Example optical elements included in the optical assembly 530 include: an aperture, a Fresnel lens, a convex lens, a concave lens, a filter, a reflecting surface, or any other suitable optical element that affects image light. Moreover, the optical assembly 530 may include combinations of different optical elements. In some embodiments, one or more of the optical elements in the optical assembly 530 may have one or more coatings, such as partially reflective or anti-reflective coatings.

Magnification and focusing of the image light by the optical assembly 530 allows the electronic display 525 to be physically smaller, weigh less and consume less power than larger displays. Additionally, magnification may increase the field of view of the content presented by the electronic display 525. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 530 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 525 for display is pre-distorted, and the optical assembly 530 corrects the distortion when it receives image light from the electronic display 525 generated based on the content.

The IMU 540 is an electronic device that generates data indicating a position of the HMD 505 based on measurement signals received from one or more of the position sensors 535 and from depth information received from the DCA 520. A position sensor 535 generates one or more measurement signals in response to motion of the HMD 505. Examples of position sensors 535 include: one or more accelerometers, one or more gyroscopes, one or more magnetometers, another suitable type of sensor that detects motion, a type of sensor used for error correction of the IMU 540, or some combination thereof. The position sensors 535 may be located external to the IMU 540, internal to the IMU 540, or some combination thereof.

Based on the one or more measurement signals from one or more position sensors 535, the IMU 540 generates data indicating an estimated current position of the HMD 505 relative to an initial position of the HMD 505. For example, the position sensors 535 include multiple accelerometers to measure translational motion (forward/back, up/down, left/right) and multiple gyroscopes to measure rotational motion (e.g., pitch, yaw, roll). In some embodiments, the IMU 540 rapidly samples the measurement signals and calculates the estimated current position of the HMD 505 from the sampled data. For example, the IMU 540 integrates the measurement signals received from the accelerometers over time to estimate a velocity vector and integrates the velocity vector over time to determine an estimated current position of a reference point on the HMD 505. Alternatively, the IMU 540 provides the sampled measurement signals to the console 510, which interprets the data to reduce error. The reference point is a point that may be used to describe the position of the HMD 505. The reference point may generally be defined as a point in space or a position related to the HMD's 505 orientation and position.

The IMU 540 receives one or more parameters from the console 510. The one or more parameters are used to maintain tracking of the HMD 505. Based on a received parameter, the IMU 540 may adjust one or more IMU parameters (e.g., sample rate). In some embodiments, certain parameters cause the IMU 540 to update an initial position of the reference point so it corresponds to a next position of the reference point. Updating the initial position of the reference point as the next calibrated position of the reference point helps reduce accumulated error associated with the current position estimated the IMU 540. The accumulated error, also referred to as drift error, causes the estimated position of the reference point to "drift" away from the actual position of the reference point over time. In some embodiments of the HMD 505, the IMU 540 may be a dedicated hardware component. In other embodiments, the IMU 540 may be a software component implemented in one or more processors.

In some embodiments, the eye tracking system 545 is integrated into the HMD 505. The eye tracking system 545 determines eye tracking information associated with an eye of a user wearing the HMD 505. The eye tracking information determined by the eye tracking system 545 may comprise information about an orientation of the user's eye, i.e., information about an angle of an eye-gaze. In some embodiments, the eye tracking system 545 is integrated into the optical assembly 530. An embodiment of the eye-tracking system 545 may comprise an illumination source and an imaging device (camera).

In some embodiments, the varifocal module 550 is further integrated into the HMD 505. The varifocal module 550 may be coupled to the eye tracking system 545 to obtain eye tracking information determined by the eye tracking system 545. The varifocal module 550 may be configured to adjust focus of one or more images displayed on the electronic display 525, based on the determined eye tracking information obtained from the eye tracking system 545. In this way, the varifocal module 550 can mitigate vergence-accommodation conflict in relation to image light. The varifocal module 550 can be interfaced (e.g., either mechanically or electrically) with at least one of the electronic display 525 and at least one optical element of the optical assembly 530. Then, the varifocal module 550 may be configured to adjust focus of the one or more images displayed on the electronic display 525 by adjusting position of at least one of the electronic display 525 and the at least one optical element of the optical assembly 530, based on the determined eye tracking information obtained from the eye tracking system 545. By adjusting the position, the varifocal module 550 varies focus of image light output from the electronic display 525 towards the user's eye. The varifocal module 550 may be also configured to adjust resolution of the images displayed on the electronic display 525 by performing foveated rendering of the displayed images, based at least in part on the determined eye tracking information obtained from the eye tracking system 545. In this case, the varifocal module 550 provides appropriate image signals to the electronic display 525. The varifocal module 550 provides image signals with a maximum pixel density for the electronic display 525 only in a foveal region of the user's eye-gaze, while providing image signals with lower pixel densities in other regions of the electronic display 525. In one embodiment, the varifocal module 550 may utilize the depth information obtained by the DCA 520 to, e.g., generate content for presentation on the electronic display 525.

The I/O interface 515 is a device that allows a user to send action requests and receive responses from the console 510. An action request is a request to perform a particular action. For example, an action request may be an instruction to start or end capture of image or video data or an instruction to perform a particular action within an application. The I/O interface 515 may include one or more input devices. Example input devices include: a keyboard, a mouse, a game controller, or any other suitable device for receiving action requests and communicating the action requests to the console 510. An action request received by the I/O interface 515 is communicated to the console 510, which performs an action corresponding to the action request. In some embodiments, the I/O interface 515 includes an IMU 540 that captures calibration data indicating an estimated position of the I/O interface 515 relative to an initial position of the I/O interface 515. In some embodiments, the I/O interface 515 may provide haptic feedback to the user in accordance with instructions received from the console 510. For example, haptic feedback is provided when an action request is received, or the console 510 communicates instructions to the I/O interface 515 causing the I/O interface 515 to generate haptic feedback when the console 510 performs an action.

The console 510 provides content to the HMD 505 for processing in accordance with information received from one or more of: the DCA 520, the HMD 505, and the I/O interface 515. In the example shown in FIG. 5, the console 510 includes an application store 555, a tracking module 560, and an engine 565. Some embodiments of the console 510 have different modules or components than those described in conjunction with FIG. 5. Similarly, the functions further described below may be distributed among components of the console 510 in a different manner than described in conjunction with FIG. 5.

The application store 555 stores one or more applications for execution by the console 510. An application is a group of instructions, that when executed by a processor, generates content for presentation to the user. Content generated by an application may be in response to inputs received from the user via movement of the HMD 505 or the I/O interface 515. Examples of applications include: gaming applications, conferencing applications, video playback applications, or other suitable applications.

The tracking module 560 calibrates the HMD system 500 using one or more calibration parameters and may adjust one or more calibration parameters to reduce error in determination of the position of the HMD 505 or of the I/O interface 515. For example, the tracking module 560 communicates a calibration parameter to the DCA 520 to adjust the focus of the DCA 520 to more accurately determine positions of structured light elements captured by the DCA 520. Calibration performed by the tracking module 560 also accounts for information received from the IMU 540 in the HMD 505 and/or an IMU 540 included in the I/O interface 515. Additionally, if tracking of the HMD 505 is lost (e.g., the DCA 520 loses line of sight of at least a threshold number of structured light elements), the tracking module 560 may re-calibrate some or all of the HMD system 500.

The tracking module 560 tracks movements of the HMD 505 or of the I/O interface 515 using information from the DCA 520, the one or more position sensors 535, the IMU 540 or some combination thereof. For example, the tracking module 550 determines a position of a reference point of the HMD 505 in a mapping of a local area based on information from the HMD 505. The tracking module 560 may also determine positions of the reference point of the HMD 505 or a reference point of the I/O interface 515 using data indicating a position of the HMD 505 from the IMU 540 or using data indicating a position of the I/O interface 515 from an IMU 540 included in the I/O interface 515, respectively. Additionally, in some embodiments, the tracking module 560 may use portions of data indicating a position or the HMD 505 from the IMU 540 as well as representations of the local area from the DCA 520 to predict a future location of the HMD 505. The tracking module 560 provides the estimated or predicted future position of the HMD 505 or the I/O interface 515 to the engine 555.

The engine 565 generates a 3D mapping of the area surrounding some or all of the HMD 505 (i.e., the "local area") based on information received from the HMD 505. In some embodiments, the engine 565 determines depth information for the 3D mapping of the local area based on information received from the DCA 520 that is relevant for techniques used in computing depth. The engine 565 may calculate depth information using one or more techniques in computing depth from the portion of the reflected polarized light detected by the DCA 520, such as the structured light illumination technique and the time-of-flight technique. In various embodiments, the engine 565 uses the depth information to, e.g., update a model of the local area, and generate content based in part on the updated model.

The engine 565 also executes applications within the HMD system 500 and receives position information, acceleration information, velocity information, predicted future positions, or some combination thereof, of the HMD 505 from the tracking module 560. Based on the received information, the engine 565 determines content to provide to the HMD 505 for presentation to the user. For example, if the received information indicates that the user has looked to the left, the engine 565 generates content for the HMD 505 that mirrors the user's movement in a virtual environment or in an environment augmenting the local area with additional content. Additionally, the engine 565 performs an action within an application executing on the console 510 in response to an action request received from the I/O interface 515 and provides feedback to the user that the action was performed. The provided feedback may be visual or audible feedback via the HMD 505 or haptic feedback via the I/O interface 515.

In some embodiments, based on the eye tracking information (e.g., orientation of the user's eye) received from the eye tracking system 545, the engine 565 determines resolution of the content provided to the HMD 505 for presentation to the user on the electronic display 525. The engine 565 provides the content to the HMD 605 having a maximum pixel resolution on the electronic display 525 in a foveal region of the user's gaze, whereas the engine 565 provides a lower pixel resolution in other regions of the electronic display 525, thus achieving less power consumption at the HMD 505 and saving computing cycles of the console 510 without compromising a visual experience of the user. In some embodiments, the engine 565 can further use the eye tracking information to adjust where objects are displayed on the electronic display 525 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
a light generator configured to illuminate a local area with polarized light, the light generator comprising:
an illumination source configured to emit one or more optical beams,
a diffraction element configured to diffract the one or more optical beams to generate diffracted light, and
a projection assembly configured to project the diffracted light into the local area as the polarized light having a first polarization;
an imaging device configured to:
receive light from the local area, the received light including ambient light and light reflected from one or more objects in the local area, and
detect a portion of the reflected light having a second polarization based on polarization information of the portion of the reflected light by reducing an intensity of a portion of the received light having a polarization different than the second polarization; and
a controller configured to determine depth information for the one or more objects based at least in part on the detected portion of the reflected light.

2. The DCA of claim 1, wherein the diffraction element includes:

an acousto-optic device configured to function as a dynamic diffraction grating that diffracts the one or more optical beams to form the diffracted light.

3. The DCA of claim 2, wherein the controller is further configured to:
create emission instructions comprising information about a radio frequency at which the acousto-optic device is driven; and
modify the radio frequency to adjust a diffraction angle at which the one or more optical beams are diffracted by the acousto-optic device to form the diffracted light.

4. The DCA of claim 3, wherein the acousto-optic device includes a transducer and a diffraction area, and responsive to the radio frequency in the emission instructions, the transducer is configured to generate a sound wave in the diffraction area to form the dynamic diffraction grating.

5. The DCA of claim 2, wherein the acousto-optic device is further configured to:
directly generate the diffracted light as the polarized light satisfying the Bragg phase matching condition for Bragg matching the one or more optical beams incident to the acousto-optic device.

6. The DCA of claim 1, the diffraction element includes a grating configured to directly generate the diffracted light as the polarized light satisfying the Raman-Nath diffraction condition.

7. The DCA of claim 1, wherein the illumination source directly generates the one or more optical beams as light of a specific polarization by using a polarizing element associated with the illumination source.

8. The DCA of claim 1, wherein the illumination source is selected from a group consisting of a light source operating in a continuous wave mode, and a light source operating in a pulsed mode.

9. The DCA of claim 1, wherein the second polarization is orthogonal to the first polarization.

10. The DCA of claim 1, wherein the imaging device includes:
a camera; and
a polarizing element positioned in front of the camera, the polarizing element configured to
propagate the portion of the reflected polarized light having the second polarization, and
block propagation of other light components including ambient light having polarization different from the second polarization.

11. The DCA of claim 1, wherein:
the polarized light is circularly polarized at a first handedness; and
the portion of the reflected polarized light is circularly polarized at a second handedness orthogonal to the first handedness.

12. The DCA of claim 1, wherein the diffraction element is selected from a group consisting of an acousto-optic device, an electro-optical device, and a mirror scanner device.

13. The DCA of claim 1, wherein the portion of the reflected polarized light is selected from a group consisting of linearly polarized light, circularly polarized light and elliptically polarized light each having the second polarization orthogonal to the first polarization.

14. The DCA of claim 1, wherein the DCA is a component of a head-mounted display.

15. A method comprising:
generating diffracted light from one or more optical beams;
projecting the diffracted light into a local area as polarized light having a first polarization;
receiving light from the local area, the received light including ambient light and light reflected from one or more objects in the local area;
detecting a portion of the reflected light having a second polarization based on polarization information of the portion of the reflected light by reducing an intensity of a portion of the received light having a polarization different than the second polarization; and
determining depth information for the one or more objects based at least in part on the detected portion of the reflected polarized light.

16. The method of claim 15, wherein generating the diffracted light comprises:
diffracting the one or more optical beams using a dynamic diffraction grating to form the diffracted light.

17. The method of claim 16, further comprising:
generating emission instructions comprising information about a radio frequency;
responsive to the radio frequency in the emission instructions, generating a sound wave to form the dynamic diffraction grating; and
modifying the radio frequency to adjust a diffraction angle at which the one or more optical beams are diffracted to form the diffracted light.

18. The method of claim 15, further comprising:
directly generating the diffracted light as the polarized light.

19. The method of claim 15, further comprising:
directly generating the one or more optical beams as light of a specific polarization.

20. The method of claim 15, further comprising:
propagating the portion of the reflected polarized light having the second polarization; and
blocking propagation of other light components including ambient light having polarization different from the second polarization.

* * * * *